United States Patent [19]

Wald et al.

[11] 4,350,727

[45] Sep. 21, 1982

[54] SYNERGISTIC TEXTILE COMPOSITE

[75] Inventors: Stephen A. Wald; Robert W. Carter, both of Winston-Salem, N.C.

[73] Assignee: Lydall, Inc., Manchester, Conn.

[21] Appl. No.: 306,533

[22] Filed: Sep. 28, 1981

Related U.S. Application Data

[63] Continuation-in-part of Ser. No. 167,216, Jul. 9, 1980, abandoned.

[51] Int. Cl.³ .............................................. B32B 3/06
[52] U.S. Cl. ..................................... 428/102; 112/440;
428/138; 428/218; 428/219; 428/234; 428/235;
428/240; 428/241; 428/253; 428/283; 428/284;
428/300
[58] Field of Search ............... 428/218, 219, 234, 235,
428/236, 237, 240, 241, 253, 283, 284, 298, 300,
301, 302, 327, 102, 138; 112/420, 440

[56] References Cited

U.S. PATENT DOCUMENTS

| | | | |
|---|---|---|---|
| 3,815,341 | 6/1974 | Hamano | 55/486 |
| 4,070,519 | 1/1978 | Lefkowitz et al. | 428/253 |
| 4,146,663 | 3/1979 | Ikeda et al. | 428/253 |
| 4,159,360 | 6/1979 | Kim | 428/234 |
| 4,181,514 | 1/1980 | Lefkowitz et al. | 428/102 |
| 4,230,762 | 10/1980 | Iwasaki et al. | 428/300 |
| 4,307,145 | 12/1981 | Goldman | 428/234 |

Primary Examiner—James J. Bell
Attorney, Agent, or Firm—Murray and Whisenhunt

[57] ABSTRACT

A textile composite is provided which comprises a nonwoven textile fabric, composed of textile fibers needled together into a network of coherently entangled fibers and having an overall bulk density of between 4 and 20 lbs. per cubic foot, and a knitted textile fabric, having a weight of between 1 and 8 ozs. per square yard, bound to the needled fabric. The binding of the fabrics is such that at least one tensile property of the composite is greater than the sum of that same property of the nonwoven and knitted fabrics. That same property is measurable at an extension which is the same or less than the extension at failure of the composite.

24 Claims, 5 Drawing Figures

LEGEND FOR FIGURES 1-5

——— COMPOSITE FABRIC
— — — KNITTED FRABRIC
—·—·—} NEEDLED FABRIC

—··—··—} MATHEMATICAL CURVE

Fig. 1

LEGEND FOR FIGURES 1-5

——————— COMPOSITE FABRIC
— — — — KNITTED FRABRIC
—··—··—} NEEDLED FABRIC
— — — —} MATHEMATICAL CURVE

SYNERGISTIC TEXTILE COMPOSITE

This application is a Continuation-in-Part of earlier filed copending application Ser. No. 167,216, filed on July 9, 1980, now abandoned.

The present invention relates to a composite textile fabric, and more particularly, to such composite being comprised of a non-woven needled fabric and a knitted fabric. In more particularity, the invention relates to such composite which provides a synergistic result in regard to the physical properties of the composite, as opposed to the physical properties of the components of the composite.

BACKGROUND OF THE INVENTION

Composites comprising textiles have been prepared in the art to provide some combination of the properties of the textiles used in preparing the composite. For example, the art has provided composites of batts of fibers and a woven or knitted textile fabric support for use as filters. Thus, U.S. Pat. No. 3,815,341 discloses a filter having a coarsely woven or knitted base with flocked fibers glued on the surface thereof and forming an angle of 30° to 85°. However, the glued fibers have little mechanical strength.

As another example, a tufted carpet made of an abrasion resistant fiber can be formed into a composite with a high friction but relatively low abrasion resistent non-woven backing. This composition provides a combination of long wear life pile face and anti-slip backing.

In another example U.S. Pat. No. 4,070,519 discloses a filter made by placing a batt of, principally, glass or mineral fibers on a woven or knitted underlayer and needling the batt to consolidate and tack it to the underlayer. In this case the amount of needling of the batt is necessarily very limited, since otherwise the underlayer would be destroyed during needling.

In yet a further example, U.S. Pat. No. 4,181,514 discloses a filter made by forming a batt of glass or metal fibers, and stitch-knitting through the batt by the known MALIMO technique to consolidate the batt. While this provides some rudimentary combination of a fibrous batt and a lightly knitted surface, the amount of knitting and batt consolidation is quite limited.

Thus, composites of the nature known in the prior art have functioned with the properties of the textiles forming the composite operating in, essentially, mutually independent manners. In the examples given above, the woven or knitted fabric of the filter of U.S. Pat. No. 3,815,341 contributes very little to the filtration properties of the glued fibers and the glued fibers contribute little to the strength properties of the composite. Likewise, the non-woven backing of the carpet contributes little to the wear properties of the carpet pile and the tufted contributes nothing to the anti-slip properties of the backing. Similarly, the lack of consolidation of the batts of U.S. Pat. Nos. 4,070,519 and 4,181,514 prevents the batts from contributing significant strength to the composite and in the case of U.S. Pat. No. 4,181,514, the stitch-knitting, itself, provides only poor strength properties.

Thus, the properties of prior art composites have essentially resulted in no more than the properties which could be achieved by the individual textiles of the composite, operated in conjuction with each other, as opposed to being formed into a composite. The formation of such composites has been primarily for convenience purposes.

It would therefore be a significant advantage in the art to provide composites wherein the properties of the textiles forming the composite are at least additive, and indeed, even provides synergistic results. It would be a further advantage to the art to provide composites wherein high and low performance characteristics of one textile of the composite are matched with opposite high and low performance characteristics of another textile of a composite and wherein, the composite, as formed, allows these complimentary characteristics to produce a composite of better overall characteristics than the characteristics of the individual textiles forming the composite.

OBJECTS OF THE INVENTION

It is therefore an object of the invention to provide textile fabric composites wherein the properties of the composite are improved as compared to the properties of any one textile fabric forming the composite. It is another object of the invention to provide textile composites wherein certain properties of the composites are at least equal to the sum of the certain properties of the textile fabrics forming the composites. It is yet another object of the invention to provide textile fabric composites wherein certain properties of the composites are greater than the sum of the certain properties of the textile fabrics forming composites, i.e. a synergistic result. Finally, it is an object of the invention to provide a method for producing such composites.

BRIEF DESCRIPTION OF THE INVENTION

The invention is based on three primary discoveries. The first, and the more basic discovery, is that the properties of a highly needled non-woven textile fabric and the properties of a relatively tightly knitted textile fabric are complimentary. Thus, the knitted textile fabric provides the properties missing or deficient in a needled non-woven textile fabric and, vice versa, the needled non-woven textile fabric provides properties which are missing or deficient in the knitted textile fabric, when the fabrics are formed into a composite of the present nature.

A second discovery is that the needled textile fabric and the knitted textile fabric can cofunction in a composite so as to not only mitigate the deficiencies of each, but when sufficiently bound together the fabrics act in a synergistic manner, i.e. at least some of the properties of the composite are superior to the sum of the same properties of the individual fabrics.

The third discovery is that both the needled fabric and the knitted fabric must have certain minimum strengths. The strength of the needled fabric is related to its bulk density at a given weight, and the bulk density of the needled fabric of the present composites must be at least 4 lbs. per cubic foot. Similarly, the strength of a knitted fabric is related to its weight, and the weight of the knitted fabric of the present composite must be at least 1 oz. per square yard. On the other hand, the respective strengths of the needled and knitted fabrics should not be overly out of balance. Hence the bulk density of the needled fabric should be between 4 and 20 lbs. per cubic foot and the weight of the knitted fabric should be between 1 and 8 ozs. per square yard.

Thus, broadly stated the present invention provides a textile composite comprising a non-woven textile fabric composed of textile fibers needled together into a network of coherently intangled fibers and having an overall bulk density of between 4 and 20 lbs. per cubic foot and a knitted textile fabric having a weight of between 1 and 8 ozs. per square yard, said fabrics being bound together so as to form a unitary composite thereof. The binding of the fabrics is such that at least one tensile property of the composite is greater than the sum of that same property of the said non-woven and knitted fabrics, provided that the said property is measurable at an extension which is the same or less than the extension at failure of the composite.

Correspondingly, there is provided a method for producing that composite comprising binding the said needled fabric to the said knitted fabric, wherein the binding is such that at least one tensile property of the composite is greater than the sum of that same property of the non-woven and the knitted fabrics, provided that the same property is measurable at an extension which is the same or less than the extension at failure of the composite.

Such binding of the fabrics may be achieved by a number of means including the use of an adhesive, stitching, needling, and heat fusion and under some stress conditions friction alone may be used. The particular means of so binding the fabrics is not critical, and it is only necessary that the fabrics be so bound that the above results are achieved.

BRIEF DESCRIPTION OF THE DRAWINGS

FIG. 4 also reproduces the curves of FIG. 1 for the knitted fabric, needled fabric and mathematical addition thereof, for comparison purposes.

FIG. 5 also reproduces the stress strain curves of the fabrics tested in a side-by-side configuration, as shown in FIG. 4, for comparison purposes.

DETAILED DESCRIPTION OF THE INVENTION

As noted above, the present composite is a combination of a highly needled textile fabric and a relatively tightly knitted textile fabric. While the advantages of the present invention may be provided by a combination of a plurality of needled textile fabrics and a combination of a plurality of knitted textile fabrics, for most applications, the composite will be a combination of a single needled textile fabric and a single knitted textile fabric. Thus, for the sake of conciseness, the invention wil be described hereinafter only in connection with the use of a single knitted textile fabric and a single needled textile fabric forming the composite, but it should be understood that this description and the following claims are intended to also relate to a plurality of needled textile fabrics and a plurality of knitted textile fabrics forming a single composite.

Further, the term "textile fabric" as used herein is intended to refer to those textile structures which are of a finished formed shape, have substantial tensile load bearing properties consistent with the usual definition of "fabric", e.g. a 25% elongation tensile stress of at least 0.2 kg/cm., and may be cut, sewed or otherwise manufactured in the manner of a normal textile cloth. The term is not intended to include relatively unconsolidated batts, webs and the like which might be formed in conventional processes, such as air-laying of fibers, wet-laying of fibers, carding of fibers, spun bonding, light tack needling or stitch-knitting and the like. Further, as can be easily appreciated, this term also means that the "textile fabric" is necessarily made of "textile fibers". Textile fibers are, of course, natural fibers, e.g. wool, cotton, hemp, or polymeric fibers, e.g. polyester, nylon, rayon, polyvinylchloride and acrylic fibers, which definition does not, of course, include non-textile fibers, such as glass, mineral or metal fibers. These latter fibers are not operable in the present invention for obvious reasons.

The non-woven textile fabric of the invention is comprised of textile fibers needled together into a network of coherently intangled fibers. Needling of this nature is known to the art and such textile fabrics are commercially available. Conventionally, textile fabrics of this nature are made into blankets, automobile headliners, bed spreads, industrial goods such as luggage, and the like. While any of the conventional needled fabrics can achieve at least some of the benefits of the present invention, the needled fabrics, which provide results greater than the sum of the property of the needled and knitted fabrics, are those which have an overall bulk density of at least 4 lbs./ft.$^3$, and preferably have an overall bulk density of at least 5 lbs./ft.$^3$ and ideally between 6 and 15 lbs./ft.$^3$ and up to 20 lbs./ft.$^3$.

The knitted fabric can be produced by any of the conventional knitting techniques, but must have a weight of at least 1 oz./sq. yd. and up to 8 ozs./sq. yd., but more usually between about 2 ozs./sq. yd. and 6 ozs./sq. yd.

In addition, the needled fabric may contain a filler, as is common in the art, and any of the conventional needled fabric fillers may be used. The filler is used, primarily, to improve the hand and feel of the needled fabric and normally does not add substantially to the tensile properties thereof. Thus, any of the conventional fillers, such as latex, clay and the like, may be used.

The needled fabric and the knitted fabric are bound together in such a manner that there is at least one tensile property of the composite which is greater than the sum of that same tensile property of both the needled and knitted fabrics. This has not been achieved in the prior art. Most surprisingly, with such binding of the fabrics, this synergistic effect is achieved.

Achieving a binding of the fabrics of this nature may be provided by a variety of means. For example, the fabrics may be simply stitched together by a conventional sewing machine or they may be stitched together in a needling machine, by procedures known to the art, whereby the mechanical binding of the fabrics are sufficient to provide the synergistic result in the nature described above. However, preferably, the binding is by adhesion, since this is more convenient. The adhesion may be by any conventional textile adhesives, such as polyurethanes, polyvinyl chloride, polyacrylates, polyethylene or polypropylene, but it is preferred that the adhesion be by thermoplastic fusion. Fusion may be achieved by either fusing thermoplastic fibers of the needled and/or knitted fabric or it may be achieved by interposing a thermoplastic fusible material between the fabrics and then heat fusing the fabrics into the composite. In the former regard, this requires that at least some of the fibers of at least one of the fabrics be heat fusible (theromplastic), e.g. nylon, Dacron, polypropylene, polyethylene, and the like. The fabrics may actually be mixtures of fibers and the fusion of the fibers can be achieved so long as at least some of the fibers are fusible fibers. More conveniently, however, the heat fusion is the fusion of a fusible composition interposed between the fabrics at the interface thereof. This may be in the form of a film coated on at least one of the fabrics or a preformed film interposed between the fabrics at the interface thereof. Polyethylene films, polyurethane films and the like are suitable in this regard, and the technique for heat fusing is known in the art. The film may be a solid film, a perforated film or a "spider web film".

In any event, with proper binding, at least one tensile property of the composite will be equal to or greater than the sum of the same property of the needled and knitted fabrics.

Ideally, the bonding of the needled fabric to the knitted fabric should be such that a monolithic break will occur in an ultimate tensile strength test. The term "monolithic break" means that the knitted fabric and the needled fabric of the composite fail essentially at the same time, as opposed to a first failure in one of the fabrics, and a subsequent failure of the other fabric. As can be appreciated, the failure of one of the fabrics will ordinarily make that composite useless for the function intended. Thus, for purposes of the present specification and claims, the term "failure of composite" means a failure of either or both of the fabrics of the composite. With the preferred bonding, however, the fabrics will fail essentially at the same time, i.e. a monolithic break. It should be noted that after failure of the needled fabric, some load carrying capability remains, however, since the highly entangled fibers will carry some load as they are being strung out to final separation.

While not being bound by theory, it appears that a major function of the binding of the knitted fabric to the needled fabric is that of allowing load to be transferred from the knitted fabric to the needled fabric, and vice versa. With such binding and load transfer, for example, the knitted fabric which ordinarily has a relatively low initial tensile modulus is forced to act as if it had a relatively high initial tensile modulus, similar to the relatively high tensile modulus of the needled fabric. On the other hand, for example, the needled fabric acts as though it had a relatively high intermediate tensile modulus as opposed to its relatively low intermediate tensile modulus, because the knitted fabric, which has a relatively high intermediate tensile modulus, forces such properties into the needled fabric. Thus, the two fabrics so bound compliment the deficiencies of each other to produce a composite which has properties superior to the properties of the fabrics alone.

The foregoing may be dramatically demonstrated in a standard tensile stress (for example using an Instron tensile testing machine) where a knitted fabric and a needled fabric are placed in the same jaw, but spaced apart. Under the same rate of strain, the two fabrics demonstrate tensile strength characteristics very similar to the their individual characteristics. However, when those same two fabrics are formed into a composite, according to the present invention, the characteristics exhibited by the composite are considerably different from the individual fabrics. The overall tensile strength, the initial and intermediate modulii and the elongation characteristics are considerably improved with the composite, as opposed to the individual fabrics in the same jaw. Surprisingly, it has also been found that the binding required for the present invention may be even achieved by friction alone. Thus, when the two fabrics are placed in the jaw in such a position that upon strain they bear upon each other in a frictional relationship, that frictional binding can be sufficient to cause the fabrics to co-act and provide at least some synergistic effect and even, sometimes, a monolithic break. Of course, frictional binding is not practical for many applications, but since the needled fabric has a relatively rough exterior, it is possible to achieve that binding by frictional engagement alone in some applications and is, hence, a part of the present invention.

Aside from the usually non-practical applications of frictional binding, the knitted fabric should be bound to the needled fabric with a bond strength of at least 0.2 kg./cm. This bond strength is determined in known manners by simply separating the fabrics at the end of the test sample and pulling the fabrics apart in a standard testing machine, for example an Instron tester. The load required to cause separation of the bond is calculated in kilograms per linear centimeter of the bond. More usually, however, the bond strength will be at least 1 kg.cm. and more usually at least 1.5 kg./cm. Bond strengths above 4 kg./cm. effect very little additional properties in the composite and hence bond strengths in excess thereof are not normally used. In any event, the bond strength must be sufficient that the composite provides at least one tensile property which is greater than the sum of the same at least one tensile property of the non-woven and knitted fabric.

The needled fabric may be manufactured by known techniques. Thus, briefly stated, a web of fibers is first layed, having the desired weight of the ultimate needled fabric. That web is then passed serially through a series of needling heads where the fibers are oriented, entangled and intertwined such that the finished needled fabric has substantial tensile properties. Such processes for producing needled fabrics are well known in the art and will not be described herein for sake of conciseness. The process of U.S. Pat. No. 3,817,820, for producing non-woven fabrics from staple fibers is acceptable for the present needling, since it can easily provide the presently required densities, although other apparatus and techniques also can be used to achieve the present densities. The process of that patent includes needling from both sides of the batt of staple fibers whereby a more homogenously needled fabric will result. To achieve the present overall bulk densities, relatively high amounts of needling will be required. Thus, needling to the extent of at least 1,000 needled punches per square inch will generally be required, depending upon the needle barb configuration and the degree of penetration of the needles, but more usually at least 3,000 needles punches per square inch will be required. Ideally, there will be at least 5,000 needle punches per square inch, and for the higher densities, 6,000 to 8,000 needles punches per square inch will be used.

In the technique of the afore-noted patent, generally, the needles will penetrate the batt of fibers in the needling operations such that at least in some of the needling steps the penetration of the foremost barbs of the needles will be just before or just beyond the opposite face of the batt being needled. In addition, preferably, the batt is needled from both sides for the reasons noted above. This causes an entangled network of interlooping and interlocking of loops in the needling operation and additionally provides a system of random fiber entanglement, all of which is known and well defined in the art. The densities referred to above are on an as needled basis of the preformed non-woven fabric and do not include densities further achieved by calendering, fillers and the like.

In this later regard, however, if desired, the preformed needled fabric may by the above procedure be calendered, shrunk, filled, and the like, all of which is know to the art. Indeed, fillers can provide a beneficial property to the needled fabric. For example, the filled fabrics have a more pleasant hand and feel. Known fillers may be used, such as bentonite, chalk, kaolin, talc, clays, diatomaceous earth, silica flour, zeolites, and the like. Alternately, organic fillers or combinations of inorganic and organic fillers may be used, e.g. plasticized polyvinylchloride, natural rubber, synthetic rubber, polychloroprene rubbers, polyurethane rubbers, acrylates and the like, may be used. Co-polymer organic fillers may also be used, such as copolymers of acrylate polymers, acrylonitrile, and the like. Preferred fillers are latex fillers, since they do provide ease of application. Acrylic latex, preferably with a clay therein, is a particular useful filler in this regard.

The knitted fabric may be manufactured by any of the known techniques. However, in the case of knitted fabrics, bulk density has very little meaning and the strength of the fabric is better defined in terms of the weight per square yard, as noted above. The weight of the knitted fabric is directly related to its strength properties. While there are several varieties of knitting procedures, all result in a fabric produced by interlooping one or more ends of yarns and any of these varieties may be used for the present invention, e.g. a Jacquard knit, a tricot knit, an interlock knit and a Pique knit (including double knit). Irrespective of the particular knitting process or the particular knit, the preformed knitted fabric must have the above noted weights per square yard.

As noted above, the present composite has the ability to match desired properties and undesired properties of the needled fabric and the knitted fabric wherein the composite exhibits properties better than the needled fabric and the knitted fabric singly. Table 1 below shows different properties of the knitted and needled fabrics. These properties are discovered that the needled fabric and the knitted fabric have complimentary properties in this regard, in that many of the properties deficient in the knitted fabric are found to be good in the needled fabric and vice versa. By thus combining these fabrics into a composite which is bound together, as explained above, the resulting properties of the composite exhibit the better properties of both the knitted fabric and the needled fabric without exhibiting the poorer properties of both of those fabrics. This is an unusual and highly unexpected result.

TABLE 1

|  | Knitted | Needled | Composite |
| --- | --- | --- | --- |
| Abrasion resistance | ± | − | + |
| Dimensional stability | − | ± | + |

TABLE 1-continued

|  | Knitted | Needled | Composite |
| --- | --- | --- | --- |
| Drapeability | + | ± | + |
| Tear resistance | − | + | + |
| Stitch tear resistance | − | + | + |
| Shape retention | − | ± | + |
| Printability | + | − | + |
| Uniformity of properties in all directions | ± | + | + |
| Directional tensile strength | ± | ± | + |
| Cost | + | + | + |

The importance of the foregoing can be understood by considering Table 1. For example, in considering upholstery furniture, shape retention is absolutely required or otherwise the upholstery will sag and displace after being applied to the furniture. Likewise, drapeability must be present or otherwise configuring the upholstery to the furniture would be most difficult and unsightly. Of course, tensile strength must be present as well as abrasion resistance. It is also important that the upholstery fabric be capable of having a design applied thereto for appearance purposes. As can be seen from Table 1, knitted fabrics would be totally unsuitable for such use and needled fabrics, likewise would be unsuitable. However, the composite made according to the present invention is quite suitable for that use.

The same sort of analysis can be made for many uses of textile fabrics, including sewed garments, filter bags, soft-sided luggage and the like. In all of these cases neither the knitted fabric nor the needled fabric would be suitable, but the composition is quite suitable.

Another surprising discovery of the present invention is that the synergistic results, as mentioned above and discussed more fully below, are not shared by composites made of woven fabrics and needled fabrics. While not being bound by theory, it appears that the spacial configuration of the woven fabric is such that critical load distribution requirements in the composite are not met. Thus, typically when a composite of a woven fabric and a needled fabric are made according to the present method, and tested in tensile stress, the fabric actually breaks in two steps, rather than in a single monolithic break, as does the present composite. It is therefore critical that the composite be made of a knitted fabric and a needled fabric. This surprising discovery was not heretofore known in the art.

The improved properties of the present composite have been described in terms of their tensile properties. However, it should be understood that properties other than tensile properties are also improved by the present composite, as will be discussed more fully hereinafter. However, since tensile properties are the properties more normally measured in the textile industry, the present composites are best describable and explainable in terms thereof. In this regard, the ultimate tensile strength is the load in pounds at failure per unit dimension. Elongation at break is the percent elongation reached at failure. The toughness is the area under the stress strain curve generated during testing a sample to the first occurance of a failure. The tensile modulus is the slope of a modulus line connecting the origin of a stress strain curve with the stress strain curve at a chosen elongation. This means of measuring modulus is used, since a typical stress strain curve for all of the non-woven, knitted and composite fabrics do not have linear portions up to a yield point, such as in the typical case of metals, where more traditional means of measuring modulus may be used, e.g. Young's modulus. While the modulus line may connect the origin and any point of the stress strain curve, i.e. up to the breaking point, for present purposes, the more important modulii are those at lower elongations, for obvious reasons. Thus, the 25% elongation modulus is an important modulus, i.e. the slope of a line connecting the origin and the stress strain curve at 25% elongation. The 10% elongation modulus is also important.

The improved composite of the present invention will have an improvement, described above, in regard to at least one of those properties, although the composite may have such improvements in all of those properties, as well as other properties. As noted above, this improvement will be such that at least one of those properties of the composite is greater than the corresponding sum of the properties of the knitted fabric and the needled fabric. However, that improvement may be such that the composite has an improvement in a property which is at least 10% greater than the sum of that corresponding property in the non-woven needled fabric and the knitted fabric and often, that improvement can be greater than 15% or 20% and in many cases greater than 30%. For many applications the most important properties for improving are toughness and modulus, especially the 25% modulus, since these properties are more important in applications such as furniture and automobile upholstery, industrial fabrics, wear resistant fabrics and the like.

The exact values of the tensile properties will, of course, vary considerably with the particular needled and knitted fabrics chosen to produce the composite. The binding material will contribute little, if anything, to those tensile properties. The precise values for the tensile properties are of no consequence for purposes of explaining the present invention, since for any particular set of fabrics having particular values for tensile properties, the present composite made of those fabrics will have at least one property value which is greater than the sum of that same property value for both of the fabrics, provided that that property is measurable at an extension which is the same or less than the extension at failure of the composite. However, as an example, a typical knit, i.e. 80 denier interlocking knit with a weight of approximately 3 ozs./sq. yard will have a machine direction stress of 0.8 kg./cm. at 25% elongation, and a typical non-woven needled fabric of 11 ozs./sq. yard (approximately 6 lbs./cu. ft. bulk density) will have a stress of 2.7 kg./cm. at 25% elongation, giving a sum of 3.5 kg./cm. However, the stress at 25% elongation of a composite made of these two fabrics will be approximately 5.7 kg./cm. As another example, the elongation at break for that same composite is about 100%, while the elongation at break of the same knitted fabric is only 83%. Since the knitted fabric is the least extensible fabric, it would be expected that the composite could not have an elongation at break greater than the elongation at break of the knitted fabric. However, in the composite, the knitted fabric is forced to extend beyond its normal ultimate elongation and this, again, demonstrates a synergistic result.

The invention will now be illustrated by the following examples, but it is to be understood that the invention is not limited to the examples, but extends to breadth of the foregoing disclosure and following claims. In the examples, as well as in the foregoing specification and following claims, parts, percentages and ratios are by weight unless otherwise specified.

EXAMPLE 1

This example illustrates the ability of the present composite to accommodate deficiencies in one of the fabrics of the composite by virtue of that property being superior in the other fabric of the composite.

A 70 denier interlock knit of 3 ozs./sq. yard was tested in a Taber rotary platform doublehead abrasion testing machine (ASTM-1175161T) with a CS-10 wheel, 250 grams load, and 1,000 cycles. A similar test was performed with a needled fabric of approximately 11 ozs./sq. yard weight (approximately 6 lbs./cu. ft.). Both of these fabrics are commercially available. After 1,000 cycles, the knitted fabric had abraded and by casual ocular evaluation broken and napped fibers were clearly apparent. Under the same test procedures the needled fabric showed the same kind of abrasion but in an intensity at least five times greater than that of the knitted fabric. A composite of those same two fabrics was prepared and tested with the knitted fabric next to the abrading wheel. Under the same conditions the composite showed some abrasion, but there was no ocular appearance of napped or torn fibers.

Thus, the resiliency of the needled fabric does not allow that fabric to resist abrasion, and neither does the tightly looped fibers of the knitted fabric allow it to resist abrasion. However, the composite having the tightly looped fibers of the knitted fabric next to the abrading wheel and the underlying resiliency of needled fabric most substantially improved abrasion resistance of the knitted fabric when in the present composite.

EXAMPLE 2

A needled fabric was prepared by cross-laying from carding machines 100% crimped polyester fiber of 1.5 denier and 1.5 inch cut length (KODEL Type 411-Eastman Chemical Company) in an amount of 18 ozs./sq. yard and then needling the batt in twelve needling stations for a total of approximately 10,000 needle punches per square inch (the needling apparatus and needling technique were as described in U.S. Patent 3,817,820- commercially available as FIBERWOVEN needling machines). Each needling station needled the batt from both sides with 40 gauge 3-barb needles, having a barb depth of approximately 0.003 inch and the needles were set so that the foremost barb penetrated the batt by approximately ⅛ inch past the opposite face.

The so needled batt was saturated with an acrylic latex filler, having a glass transition temperature of approximately −30° C. and the overall pick-up was approximately 4 ozs./sq. yard.

The filled fabric was dried and cured at approimately 340° F. on steam heated cans and then split into two equal halves on a Turner splitting machine to produce a filled needled fabric of approximately 11 ozs./sq. yard, wherein 2 ozs. of that weight is the weight of the filler. Each one-half of the split needled fabric was calendered to a thickness of approximately 30 mils. by a conventional calendering machine operated at approximately 400° F. and 50 lbs./linear inch of nip, at a speed of approximately 4 ft./minute.

In this test the knitted fabric was a Pique fabric with 80 denier, 100% polyester yarn, having approximately 2 denier per filament. The yarn was texturized and semi-dull and the Pique stitch was a 28 cut. The weight of the knitted fabric was 3.5 ozs./sq. yard and the fabric had been scoured and heat set.

The needled fabric was bonded to the knitted fabric with a highly perforated film of high density polyethylene (DELNET Type X530) having a weight of approximately 0.5 ozs./sq. yard. Bonding was achieved by placing the perforated polyethylene film between the knitted fabric and the needled fabric and heating in a flat platen press with the top platen heated to 400° F. and the platens placing approximately 2 lbs./sq. inch pressure on the composite. Heat was applied for approximately 30 seconds with the knitted fabric facing the heated platen. The resulting bond strength was approximately a 1.5 kg./centimeter of sample width. Bond strength was measured by pulling apart fabrics at the end of a test strip and measuring the load required to separate the fabrics. The two fabrics were clamped in the two jaws of an Instron tensile tester.

Samples were stamped from the composite with a conventional sample die of 2 centimeters width and 10 centimeters length. Samples were tested in a Instron tensile tester with the jaws initially set at 4 centimeters apart (gauge length), a cross-head speed of 10 centimeters per minute and a chart speed of 20 centimeters per minute. The load cell used in the testing was a 100 kg. load cell, adjusted to a 50 kg. full scale reading.

Figure 1:
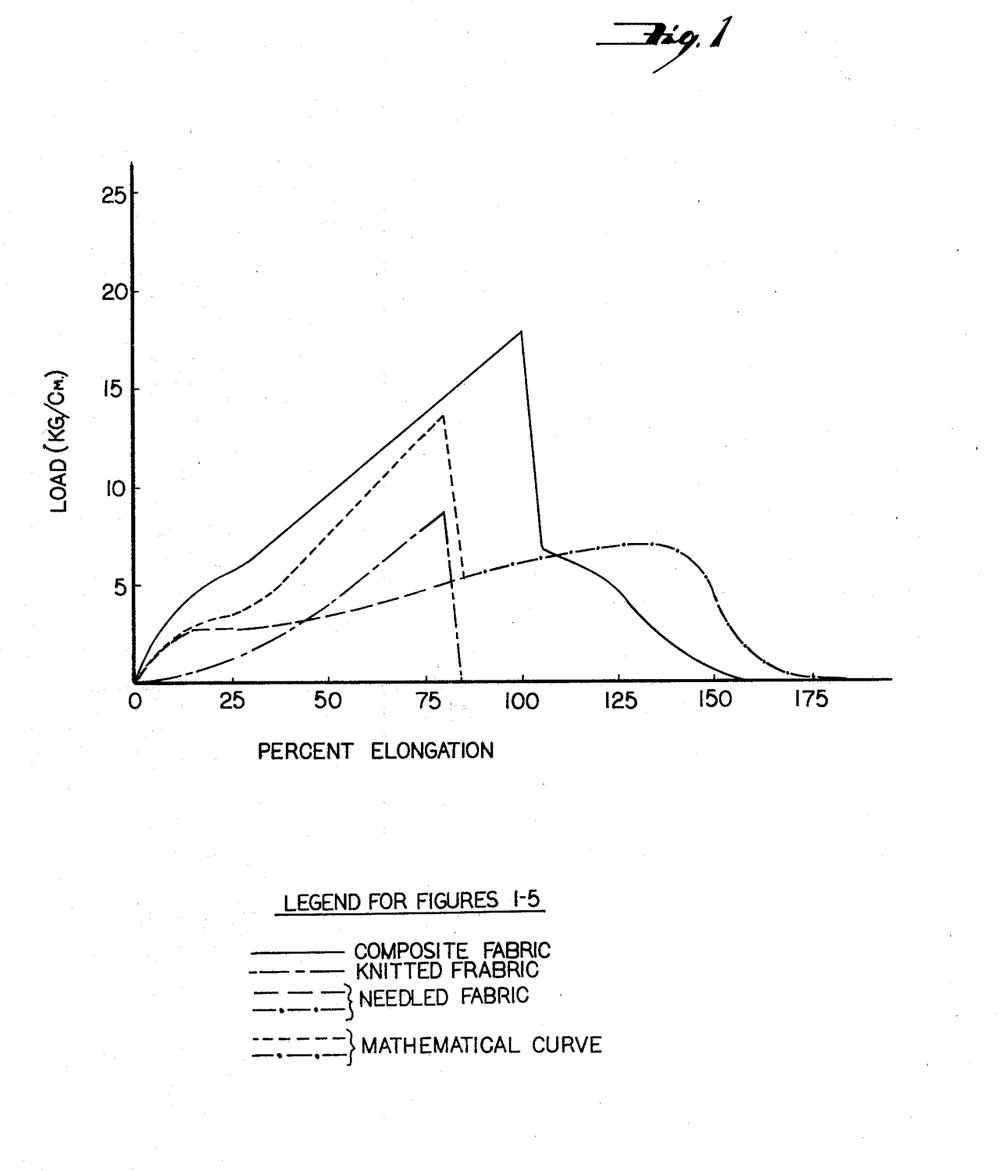
FIG. 1 shows typical stress strain curves for a knitted fabric, a needled fabric, a composite made of those two fabrics, according to the invention, and the mathematical addition of the knitted fabric and needled fabric curves, all as obtained by the procedure of Example 2.

The foregoing testing procedure was used for preparing stress strain curves for the knitted fabric, the needled fabric and the composite. Five repetitions of each sample was performed to insure the accuracy of the stress strain curve. Data taken from typical stress strain curves is shown in FIG. 1. In addition, FIG. 1 shows a mathematically generated stress strain curve obtained by adding the load of the knitted fabric alone to the load of the needled fabric alone at unit elongations. This mathematically generated curve shows the expected maximum stress strain curve, assuming that the knitted fabric and the needled fabric are capable of co-functioning together in the most ideal manner. As will be appreciated, the mathematically generated curve is the same as the needled fabric curve, after failure of the knitted fabric, and the common curve is noted by the dashed and dotted line.

As can be seen from FIG. 1, most surprisingly, the stress strain curve of the composite shows that the major tensile properties of the composite are substantially greater than the expected maximum properties as shown by the mathematically generated curve. Thus, all of the 25% modulus, ultimate tensile strength, elongation at break, and the toughness of the composite are considerably greater than the maximum of those properties which would be expected from the mathematically generated curve. Hence, a synergistic effect is achieved by the present invention.

Figure 2:
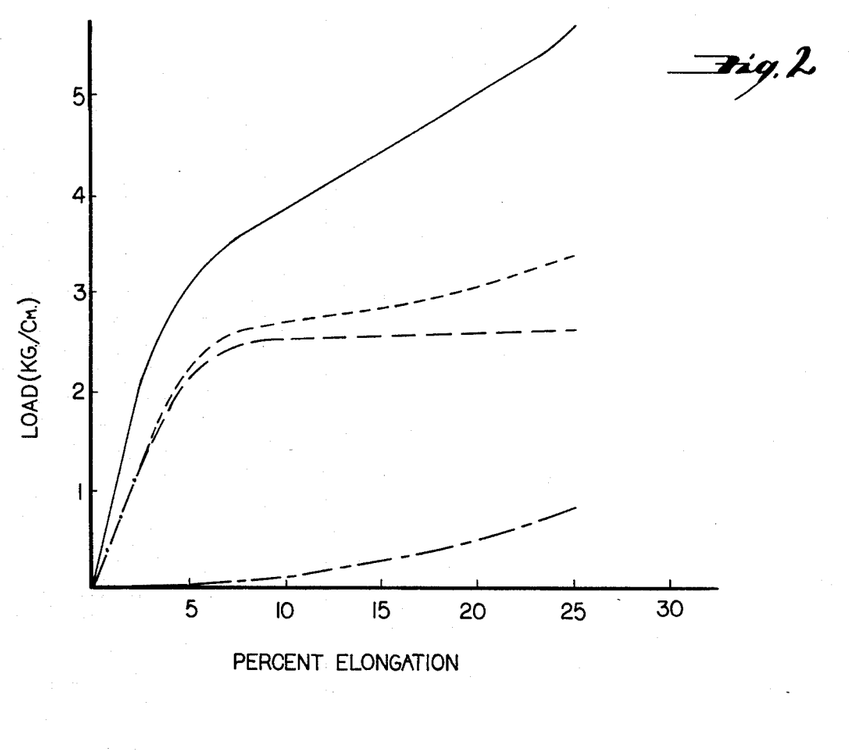
FIG. 2 shows an enlargement of the curves of FIG. 1, up to 25% elongation.

This synergistic effect can be better observed from FIG. 2 which is a portion of FIG. 1, i.e. up to about 25% elongation, and shown in an expanded scale.

EXAMPLE 3

Figure 3:
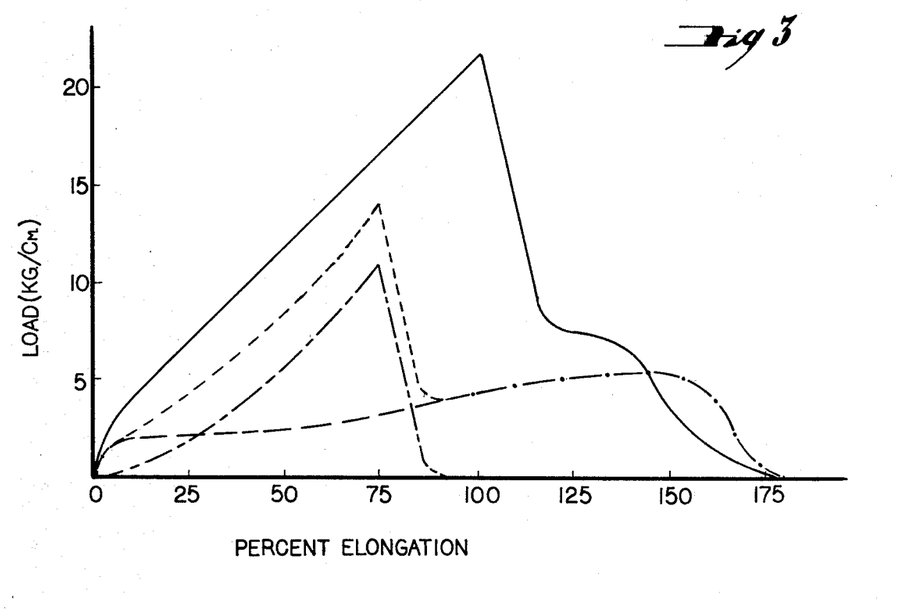
FIG. 3 shows a typical stress strain curve, as obtained by a repeat of the procedure of Example 2, but with fabric of slightly different tensile properties.

The procedure of Example 1 was repeated, except that the needled fabric and the knitted fabric used in this example had tensile properties slightly different from the tensile properties of the needled fabric and knitted fabric used in Example 1. The results of this test are shown in FIG. 3. As can be seen from that figure, (compare the mathematically generated curve, obtained by adding the load of the needled fabric and the load of the knitted fabric at unit elongations with the composite curve) the composite curve exhibits superior properties to the mathematically generated curve in all of 25% modulus, ultimate tensile strength, elongation at break and toughness. Here again, a synergistic effect is demonstrated.

EXAMPLE 4

Figure 4:
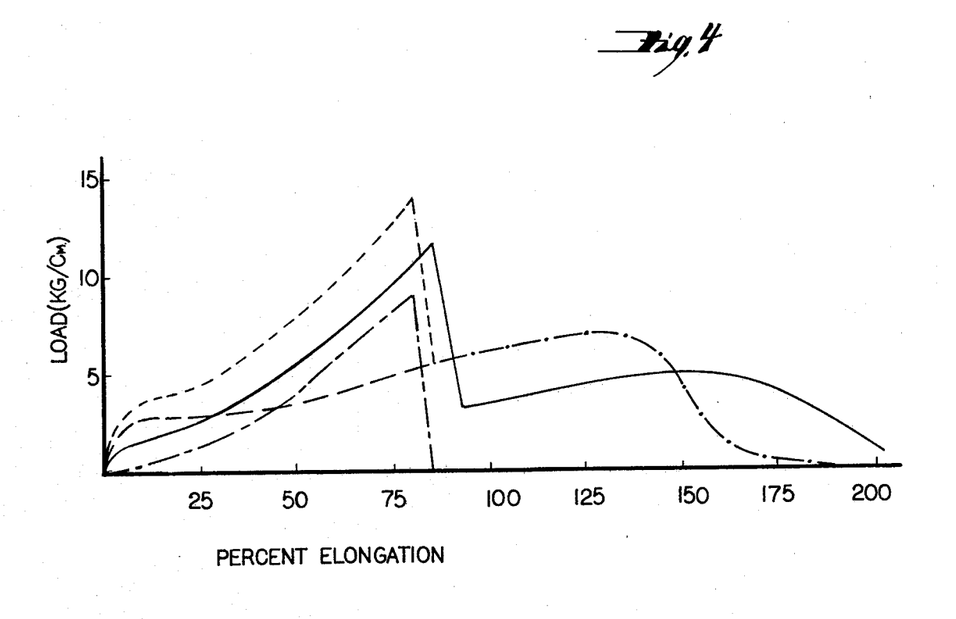
FIG. 4 shows a typical stress strain curve of the fabrics of Example 2 when simultaneously tested in a side-by-side configuration, according to the procedure of Example 2.

The fabrics used in Example 2 were placed in the jaws of the Instron tensile tester in a manner such that the fabrics were side-by-side, but not in physical contact. This produces a "combined" stress strain curve of the two fabrics acting independently. The test procedure of Example 2 was repeated and the results of this test are shown in FIG. 4. As can be seen from that figure, the two fabrics, when spaced apart, do not co-function to the extent that the results are as good as the mathematically generated curve. Indeed, the mathematically generated curve is substantially superior to the "combined" curve. Thus, the present bonding is essential to achieve a synergistic result.

EXAMPLE 5

Figure 5:
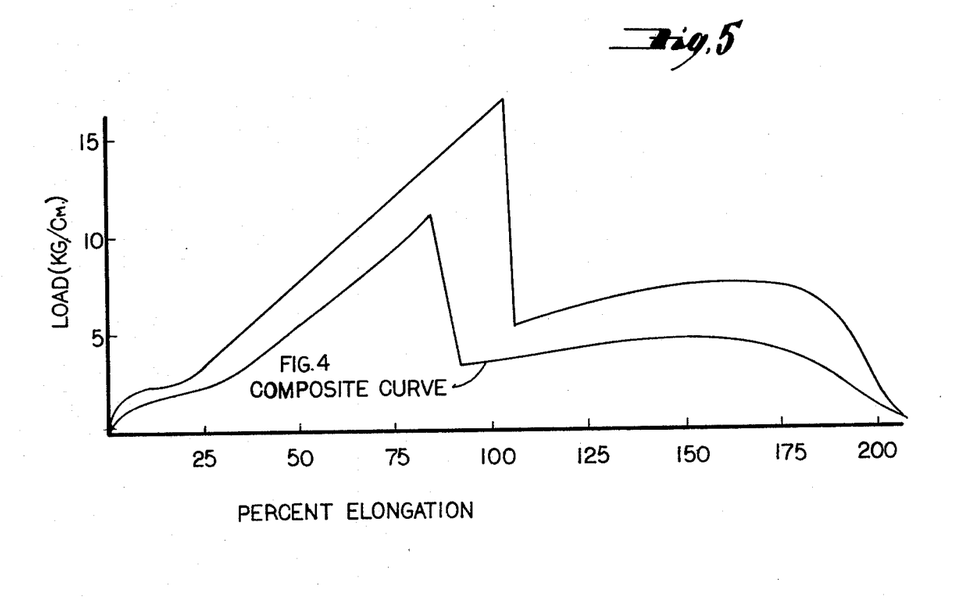
FIG. 5 shows a typical stress strain curve of the fabrics of Example 2 when simultaneously tested in a face-to-face configuration, according to the procedure of Example 2.

The procedure of Example 4 was repeated, but in this test the needled fabric and the knitted fabric were placed in a face-to-face configuration in the jaws of the Instron tensile tester, but not bonded. The fabrics, however, were capable of exhibiting considerable frictional bonding to each other, as a result of their physical contact. The results of this test are shown in FIG. 5. That figure also reproduces the "combined" stress strain curve of FIG. 4, for comparison purposes. It will be seen from FIG. 5 that the frictional bonding, achieved by the fabrics being in physical contact, provided substantially greater properties to that frictional composite than the same fabrics tested in the same manner, but physically spaced apart. This also shows the importance of the present bonding of the fabrics in order to achieve the synergistic results of the present invention. It should be appreciated that in a test of this nature, where the fabrics are in physical contact, very substantial frictional bonding can occur, particularly because of the relatively rough surface of the needled fabric and because that during the test the fabrics are forced together by reason of width-wise contraction.

It will also be observed from the foregoing figures that the load carried by the composite at any unit elongation is greater than the sum of the loads carried by the needled fabric alone and the knitted fabric alone, which again demonstrates the present synergistic result. It will also be understood that the ultimate elongation of the needled fabric and knitted fabric cannot be added to arrive at a base line from which the synergistic result is judged, since this property is, quite obviously, not additive in theory. However, it will be noted that the ultimate elongation at break of the composite is greater than the ultimate elongation of one of the fabrics of the composite, i.e. in this case-the knitted fabric. Since the knitted fabric is the least extensible fabric of the composite, the increased ultimate elongation of the composite shows that a synergistric result is again achieved.

It will be appreciated from the foregoing that for purposes of the present specification and claims, the term "greater than the sum", in connection with the ultimate elongation, means that the ultimate elongation of the composite is greater than the ultimate elongation at break of the first to fail fabric.

Having described the invention, it will be appreciated that various modifications thereof are apparent to those skilled in the art. Those modifications are intended to be embraced by the following claims.

We claim:

1. A textile composite comprising:
   (1) a non-woven textile fabric composed of textile fibers needled together into a network of coherently entangled fibers and having an overall bulk density of between 4 and 20 lbs. per cubic foot;
   (2) a knitted textile fabric having a weight of between 1 and 8 ozs. per square yard bound to the said needled fabric to form a composite thereof; and
   wherein the binding of the said fabrics is such that at least one tensile property of the composite is greater than the sum of that same property of the said non-woven and knitted fabrics, provided that the said same property is measurable at an extension which is the same or less than the extension at failure of the composite.

2. The composite of claim 1 wherein the composite fails in tensile by a monolithic break.

3. The composite of claim 1 wherein the said at least one tensile property is tensile strength at a unit elongation.

4. The composite of claim 1 where the said at least one tensile property is elongation and the elongation at break of the composite is greater than the elongation of one of the fabrics of the composite.

5. The composite of claim 1 where the said at least one tensile property is toughness.

6. The composite of claim 1 where the said at least one tensile property is tensile modulus.

7. The composite of claim 1 where the said at least one tensile property is the 10% elongation modulus.

8. The composite of claim 1 where the said at least one tensile property of the composite is at least 10% greater than the sum of the same at least one tensile property of the said non-woven and knitted fabrics.

9. The composite of claim 1 where the said at least one tensile property of the composite is at least 15% greater than the sum of the same at least one tensile property of the said non-woven and knitted fabrics.

10. The composite of claim 1 where the said at least one tensile property of the composite is at least 20% greater than the sum of the same at least one tensile property of the said non-woven and knitted fabrics.

11. The composite of claim 1 where the said at least one tensile property of the composite is at least 30% greater than the sum of the same at least one tensile property of the said non-woven and knitted fabrics.

12. The composite of claim 1 where the at least one tensile property is toughness or modulus.

13. The composite of claim 12 where the said modulus is the 25% elongation modulus.

14. The composite claim of claim 1 wherein the overall bulk density of the non-woven fabric is at least 6 lbs./ft.$^3$.

15. The composite of claim 1 wherein the non-woven fabric contains a filler.

16. The composite of claim 1 wherein the non-woven fabric and the knitted fabric are bound together by an adhesive.

17. The composite of claim 1 wherein the non-woven fabric and the knitted fabric are bound together by stitching.

18. The composite of claim 1 wherein the non-woven fabric and the knitted fabric are bound together by needling.

19. The composite of claim 1 wherein the non-woven fabric and the knitted fabric are bound together by heat fusion.

20. The composite of claim 19 wherein the heat fusion is the fusion of at least some of the fibers of the non-woven fabric or the knitted fabric, or both, at the interface of the fabrics.

21. The composite of claim 19 wherein the heat fusion is the fusion of a fusible composition interposed between the fabrics at the interface thereof.

22. The composite of claim 21 wherein the fusible composition is in the form of a film.

23. The composite of claim 22 wherein the film is a preformed film.

24. The composite of claim 1 having a decorative design on the outer surface of the knitted fabric.

* * * * *